United States Patent
Wix et al.

[11] Patent Number: 5,988,654
[45] Date of Patent: Nov. 23, 1999

[54] AUTOMATIC LEVELING SYSTEM FOR OFF-ROAD EQUIPMENT

[76] Inventors: Michael A. Wix, 1129 Mathis Hollow Rd., Centerville, Tenn. 37033; Anthony G. Wix, 642 Oakdale Ave., Hohenwald, Tenn. 38462

[21] Appl. No.: 08/847,555

[22] Filed: Apr. 24, 1997

[51] Int. Cl.[6] .................................................. B60S 9/00
[52] U.S. Cl. .................. 280/6.15; 180/89.15; 280/6.153; 280/6.154; 280/6.159; 280/DIG. 1
[58] Field of Search .......................... 280/DIG. 1, 6.154, 280/6.15, 6.159, 5.5, 5.507, FOR 100, FOR 101; 180/89.14, 89.15

[56] References Cited

U.S. PATENT DOCUMENTS

| | | |
|---|---|---|
| 3,806,141 | 4/1974 | Louis et al. ........................ 280/6.156 |
| 3,835,949 | 9/1974 | Whelan . |
| 4,288,196 | 9/1981 | Sutton, II . |
| 4,650,017 | 3/1987 | Pelletier et al. . |
| 4,679,803 | 7/1987 | Biller et al. . |
| 4,746,133 | 5/1988 | Hanser et al. . |
| 4,991,673 | 2/1991 | Ericsson . |
| 5,159,989 | 11/1992 | Claxton . |
| 5,337,847 | 8/1994 | Woods et al. . |
| 5,639,119 | 6/1997 | Plate et al. ........................ 280/DIG. 1 |

*Primary Examiner*—Eric Culbreth
*Attorney, Agent, or Firm*—Waddey & Patterson, PC.; Edward D. Lanquist, Jr.; Emily A. Shouse

[57] ABSTRACT

An automatic leveling system for off-road vehicles having a cab and boom assembly rotatably mounted on a carrier base via a tilt table. The system includes a sensing device and control circuit for adjusting the level of the cab assembly relative to the base of the vehicle. The sensing device has a pendulum gimbaled within a housing. The pendulum has a pilot shaft extending upwardly therefrom and positioned proximate four switches for sensing changes in the orientation of the cab assembly. The switches are electrically connected to control circuits for a system capable of adjusting the orientation of the tilt table. A delay circuit is provided to inhibit re-leveling during extension of the boom.

10 Claims, 6 Drawing Sheets

AUTOMATIC LEVELING SYSTEM FOR OFF-ROAD EQUIPMENT

BACKGROUND OF THE INVENTION

The present invention relates generally to leveling systems and more particularly to automatic leveling systems for off-road equipment, such as mobile vehicles for felling and handling timber. Off-road equipment for use in forestry operations and other off-road construction or excavating equipment generally comprises a tracked or wheeled carrier base having a cab or swing-house assembly rotatably mounted thereto. A boom assembly, including any necessary apparatus for felling and handling trees or for other operations, is operably mounted to the cab assembly. The cab assembly further includes an engine, hydraulic pump system and controls for operating the equipment.

Such off-road vehicles are often required to operate on uneven terrain. Accordingly, the carrier base of the vehicle may not be level when the vehicle is positioned at the desired location for performing work. Inclination of the base causes the center of gravity of the vehicle to shift away from the point of maximum load stability. Thus, the vehicle becomes unbalanced and may overturn unless adjustments are made to reduce the deviation of the center of gravity from the point of maximum load stability.

It will be appreciated by those skilled in the art that, in order to avoid the safety concerns associated with operating the vehicle on uneven terrain and the general discomfort to the operator, it is desirable that the cab assembly be substantially horizontal during operation of the vehicle. To this end, there have been several attempts to design leveling mechanisms and systems for adjusting the orientation of the cab assembly with respect to the base of the vehicle.

One such attempt was disclosed in U.S. Pat. No. 5,337,847, issued to Woods, et al. on Aug. 16, 1994, which is incorporated by reference as if fully set forth herein. The Woods, et al. invention is directed to a four-way leveling mechanism for an off-road vehicle for maintaining a superstructure of an off-road vehicle generally horizontal while the vehicle is working on uneven terrain. The tilt mechanism incorporates a spherical bearing mounted on a shaft perpendicular to the longitudinal pivot axis of the tilt mechanism to eliminate end-play in the joint which forms the longitudinal pivot axis. The longitudinal and transverse pivot axes lie in the same plane so that many of the forces which are transferred from the superstructure of the vehicle through the tilt mechanism to the chassis of the vehicle cannot cause a torque on the components of the tilt mechanism. The tilt mechanism provides for independent adjustment of the angle of tilt relative to each of the two pivot axes.

U.S. Pat. No. 4,991,673, issued to Ericsson on Feb. 12, 1991, which is incorporated by reference as if fully set forth herein, is directed to a cross-country vehicle or machine. The vehicle includes a mobile chassis and a superstructure carrying a driver's cab wherein the superstructure is mounted on the chassis for tilting movement about a horizontal axis and a transverse axis. A hydraulic cylinder on each side of the longitudinal axis acts between the chassis and the superstructure to tilt the superstructure about either or both axes in order to position the superstructure horizontally as the vehicle moves over rough ground.

U.S. Pat. No. 4,679,803, issued to Biller, et al. on Jul. 14, 1987, which is incorporated by reference as if fully set forth herein, is directed to an apparatus for maintain stability of mobile land vehicles on sloping terrain. The vehicle includes apparatus for providing multi-directional relative movement between a conventional tread assembly of the caterpillar type and a swing-house assembly which includes a boom sub-assembly supporting tree-felling and handling equipment, so that the swing house assembly is maintained in a substantially level relationship with the horizontal, regardless of the inclination of the ground on which the vehicle rides, so that the center of gravity of the vehicle is optimized by weight transfer corresponding to the type of ground inclination encountered. The leveling system of Biller, et al. is manually operated.

U.S. Pat. No. 4,650,017, issued to Pelletier, et al. on Mar. 17, 1987, which is incorporated by reference as if fully set forth herein, is directed to a crawler-mounted machine for travel over natural terrain. The vehicle includes a mobile carrier of any conventional structure and a work base mounted over the carrier. A tilt mechanism joins the work base to the carrier for relative tilting movement of the work base with respect to the carrier about a pair of orthogonal axes to hold the work base level.

U.S. Pat. No. 3,835,949, issued to Whelan on Sep. 17, 1974, and incorporated by reference as if fully set forth herein, is directed to a hydraulic leveling-control system. The system automatically maintains a height of a vehicle for all load conditions up to maximum load. The system basically involves a control valve which responds to height signals from hydraulically-operated levelers to direct fluid to the levelers when leveler chain charge pressure is needed to increase vehicle height, or to a circuit bypassing the levelers when the vehicle is at or above level height.

U.S. Pat. No. 5,159,989, issued to Claxton on Nov. 3, 1992, and incorporated by references fully set forth herein, is directed to an automatic hydraulic leveling system. The leveling system includes a low-pressure, high-flow source of hydraulic fluid which is connected for one-way flow into the head end of all four of the cylinders to lower outrigger pads of the vehicle to the ground and then maintain them in contact with the ground. A level sensor senses the relative levelness of the right-front and left-rear corners of the vehicle and high-pressure, low-flow hydraulic fluid is connected to the head end of the cylinder at the lower of those two corners to raise that corner of the vehicle relative to the ground. Likewise, another level sensor senses the relative levelness of the left-front and right-rear vehicle corners and the high-pressure, low-flow hydraulic fluid is connected to the head end of the cylinder at the lower end of those two corners to raise that corner of the vehicle relative to the ground.

U.S. Pat. No. 4,746,133, issued to Hanser, et al. on May 24, 1988, and incorporated by reference as if fully set forth herein, is directed to an automatic leveling system for use in a vehicle having a front, a back, and sides to level the vehicle relative to gravity. The system includes a plurality of devices, each disposed at an individual position relative to the vehicle and in a displaced relationship to the other devices for adjusting the vertical position of the vehicle relative to gravity in accordance with the operation of pairs of adjacent devices. A sensor is disposed relative to the vehicle for sensing the tilting of the vehicle from the level disposition relative to gravity. A system further includes an operating structure responsive to the sensor for operating pairs of adjacent devices in a particular order to obtain an adjustment in the vertical position of the vehicle from side to side and front to back to obtain a resultant leveling of the vehicle relative to gravity.

U.S. Pat. No. 4,288,196, issued to Sutton, II on Sep. 8, 1981, and incorporated by reference as if fully set forth herein, is directed to a computer-controlled backhoe have dual-access gyro which continuously senses the position of the frame and senses corresponding signals to the computer which adjusts the frame position through hydraulic actuators.

One drawback associated with many of these devices is that they include complex control circuitry and are, thus, expensive to incorporate into off-road equipment. Furthermore, rather than adjusting automatically to changes in the orientation of the vehicle, many of these devices require manual adjustment by an equipment operator in order to achieve proper leveling. What is needed, then, is an automatic leveling system for off-road equipment that incorporates a simplified sensing and control system to automatically level the cab assembly of the vehicle in response to changes in orientation. This device is presently lacking in the prior art.

SUMMARY OF THE INVENTION

The present invention is directed to an automatic leveling system for off-road vehicles, such as timber felling and handling equipment and other construction or excavating equipment having a cab and boom assembly rotatably mounted on a carrier base. The system includes a sensing device and control circuit for adjusting the level of the cab assembly relative to the base of the vehicle.

The sensing device comprises a gimbaled pendulum having a pilot bolt extending upwardly therefrom and positioned proximate four microswitches for sensing changes in the orientation of the cab assembly. The microswitches are positioned ninety degrees relative to one another and are electrically connected to control circuits for a hydraulic pump and valve system. If the cab assembly tilts due to movement of the machine over uneven terrain, the pilot bolt contacts and activates a corresponding switch. A signal from the switch to the hydraulic pump system causes the corresponding hydraulic cylinder to adjust accordingly to level the turntable on which the cab assembly is mounted. A delay circuit is provided to inhibit re-leveling during extension of the boom.

DESCRIPTION OF THE PREFERRED EMBODIMENT

Figures 1, 2:
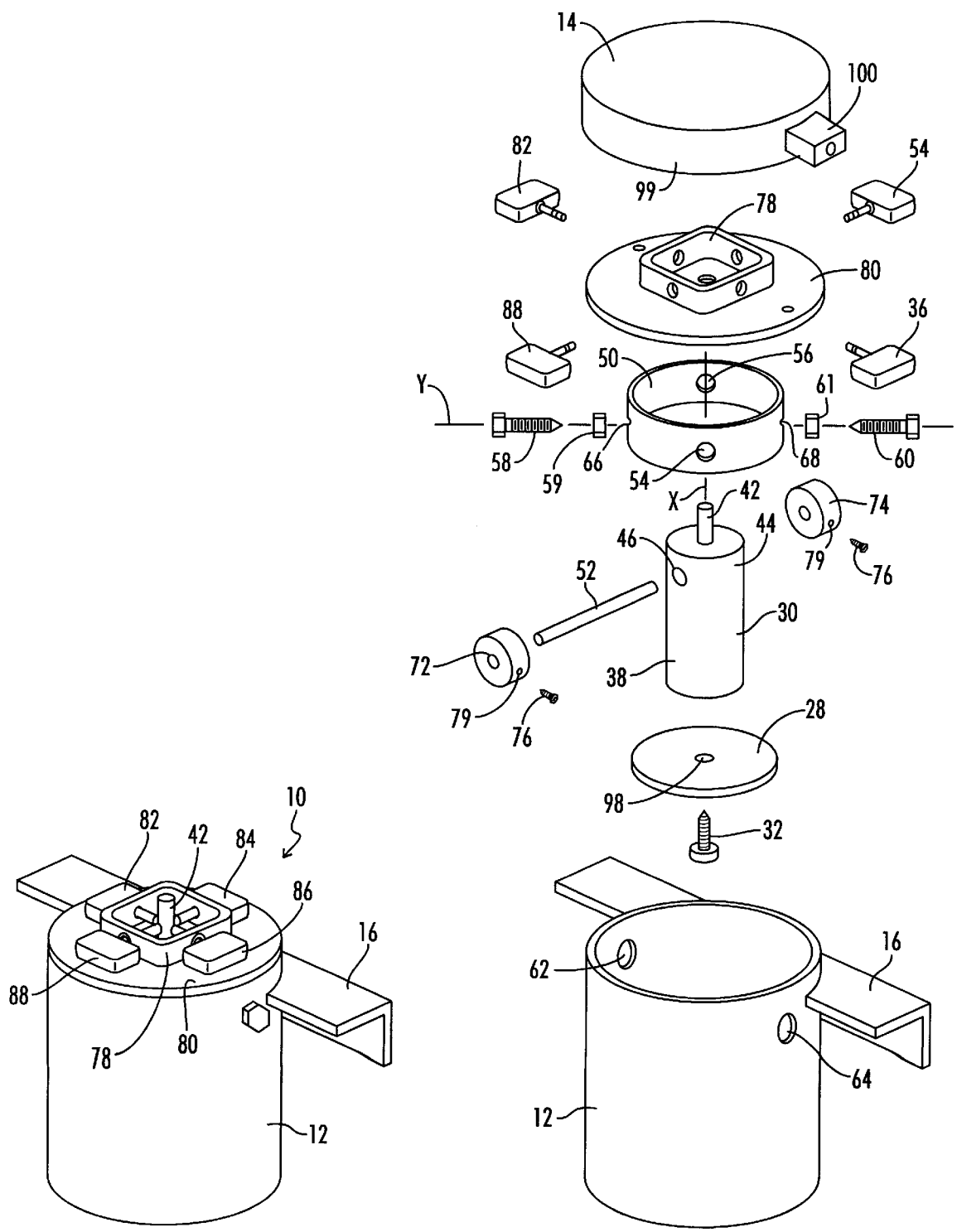
FIG. 1 is a perspective view of the leveling device of the present invention.
FIG. 2 is an exploded perspective view of the leveling device of the present invention.
Figure 3:
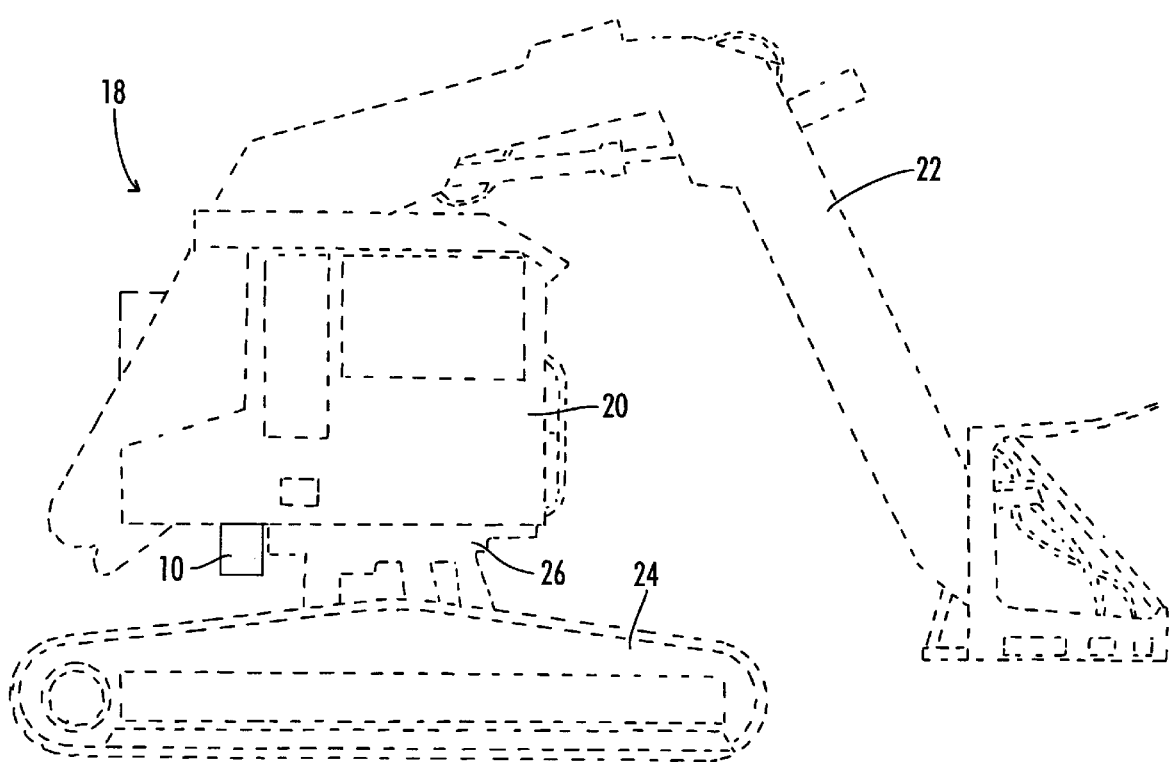
FIG. 3 is a side view of the leveling device of the present invention shown installed on an off-road timber felling and handling vehicle.

With reference to FIG. 1, the sensing device of the leveling system of the present invention is designated generally by reference numeral 10. The sensing device 10 comprises a housing 12, configured to receive a pendulum assembly, a gimbal assembly, and a switch-bracket assembly. In the preferred embodiment, the housing 12 comprises a cylindrical canister having a removable cover 14. A mounting bracket 16 is attached to an exterior surface of the housing 12 for mounting the sensing device 10 to an off-road vehicle 18 having a cab 20 and a boom assembly 22 mounted on a carrier base 24 via a tilt table 26.

Figure 4:
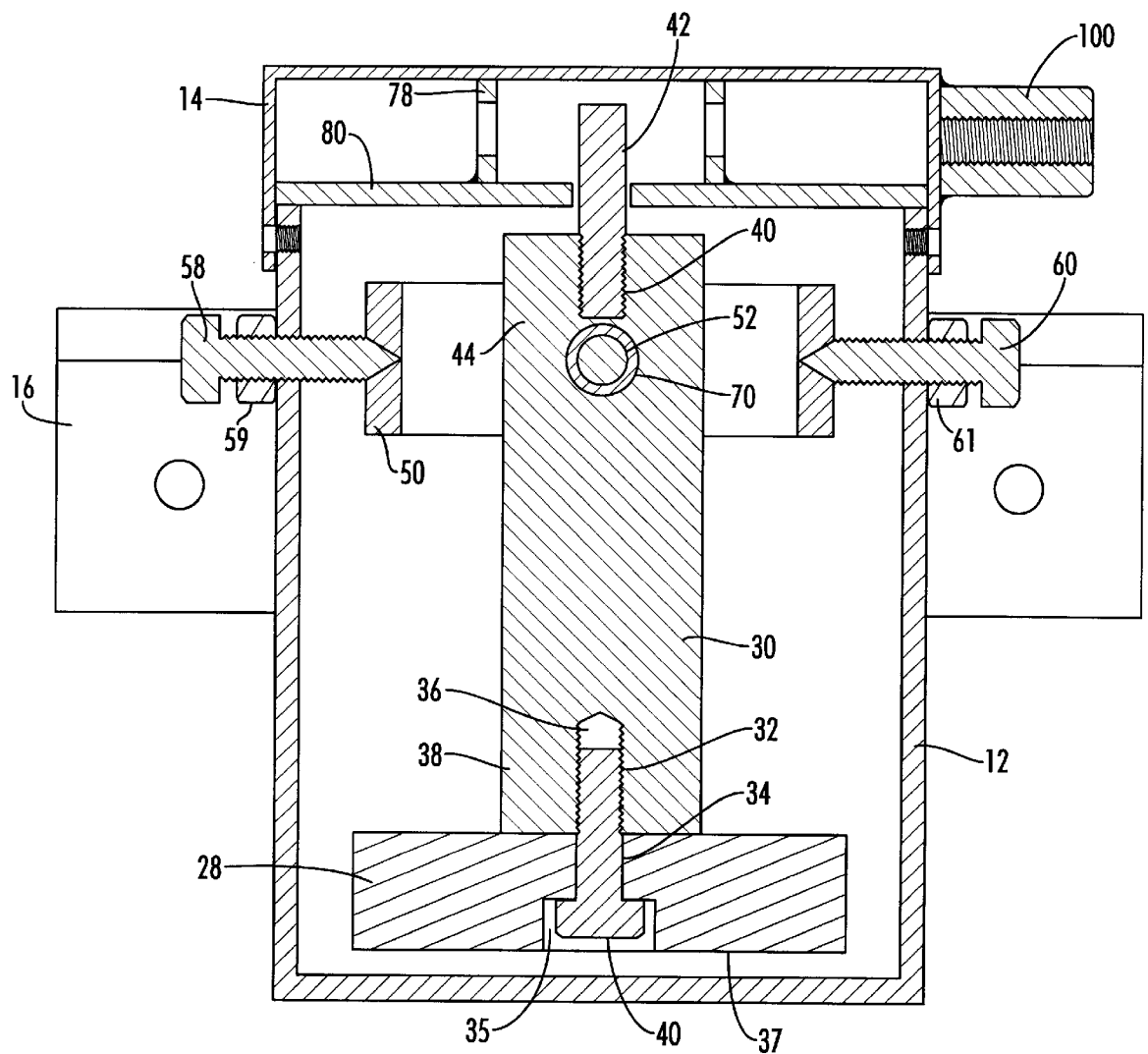
FIG. 4 is a cross sectional view of the leveling device of the present invention.

With reference to FIGS. 2 and 4, the pendulum assembly comprises a pendulum disc 28, a pendulum body 30, and a pendulum bolt 32. In the preferred embodiment, the pendulum disc 28 comprises a substantially cylindrical body having a longitudinal bore 34 extending therethrough for receiving the pendulum bolt 32 to attach the pendulum disc 28 to the pendulum body 30. The pendulum disc 28 may further include a recess 35 formed in a bottom surface 37 thereof such that a head 40 of the pendulum bolt 32 is substantially flush with the bottom surface 38 of the pendulum disc 28. In the preferred embodiment, the pendulum disc 28 is of a greater diameter than the pendulum body 30 in order to limit the range of motion of the pendulum body 30 within the housing 12.

With reference to FIG. 4, pendulum body 30 comprises a substantially cylindrical body having a central longitudinal bore 36 formed in a distal end 38 thereof, which is threaded to receive the pendulum bolt 32. In a similar manner, a central longitudinal bore 40 is formed in a proximate end 44 of the pendulum body 30 and is threaded to receive a cooperatively threaded pilot shaft 42. An axial bore 46 extends through the pendulum body 30 intermediate the proximate end 44 and a midpoint of the pendulum body 30.

Other pendulum assemblies are contemplated to be within the scope of the present invention. For example, the components of the pendulum assembly may be integrally formed such that the pendulum assembly comprises a single component.

Figure 5:
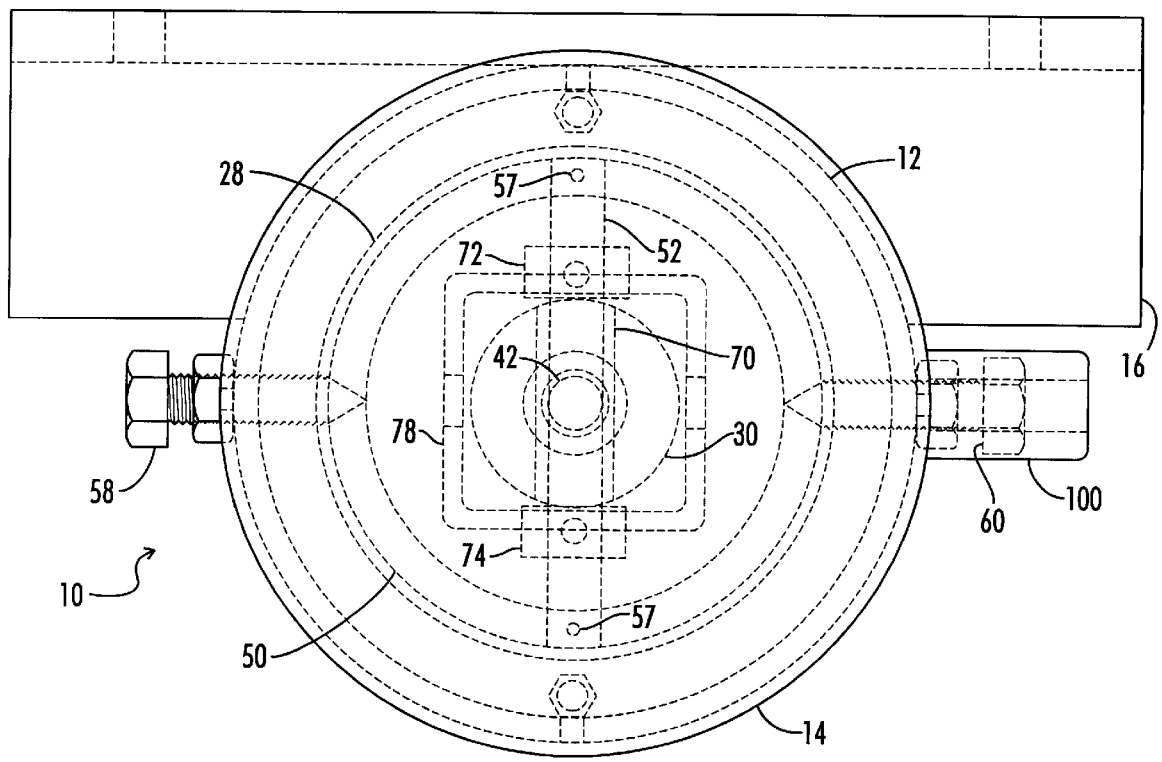
FIG. 5 is a top view of the leveling device of the present invention shown with the cover, the switches and the switch bracket base removed.

With reference to FIGS. 2, 4 and 5, the gimbal assembly of the present invention comprises a ring 50 and a pendulum support shaft 52. The pendulum support shaft 52 extends through axial bore 46 in the pendulum body 30 and has spaced apart ends, which are received within a first pair of oppositely disposed bores 54 and 56 formed in the ring 50. Each end of the pendulum support shaft 52 is retained in operable engagement with the ring 50 by a pin 57 (see FIG. 5). The ring 50 is pivotally suspended within the housing 12 by a pair of ring retainer bolts 58 and 60, which threadably engage nuts 59 and 61, and extend through a pair of bores 62 and 64 formed in the housing 12 and through a second pair of oppositely disposed bores 66 and 68 formed in the ring 50. Bores 66 and 68 formed in the ring 50 are aligned along an axis X normal to an axis Y along which bores 54 and 56 are positioned. Thus, each of bores 54, 56, 66 and 68 is located at a position that is ninety degrees relative to the adjacent bore. Accordingly, the ring 50 is pivotal about axis X, and the pendulum assembly is pivotal about axis Y.

With reference to FIGS. 4 and 5, a pendulum bushing 70, configured to receive the pendulum support shaft 52, may be disposed within axial bore 46 of the pendulum body 30. The pendulum body 30 is disposed between a pair of retainer rings 72 and 74 slidably mounted to the pendulum support shaft 52. In the preferred embodiment, a threaded set screw 76 extends through a bore 78 formed in the retainer rings 72 and 74 and frictionally engages the pendulum support shaft 52 to retain the pendulum body 30 in a desired position along the pendulum support shaft 52.

Figure 6:
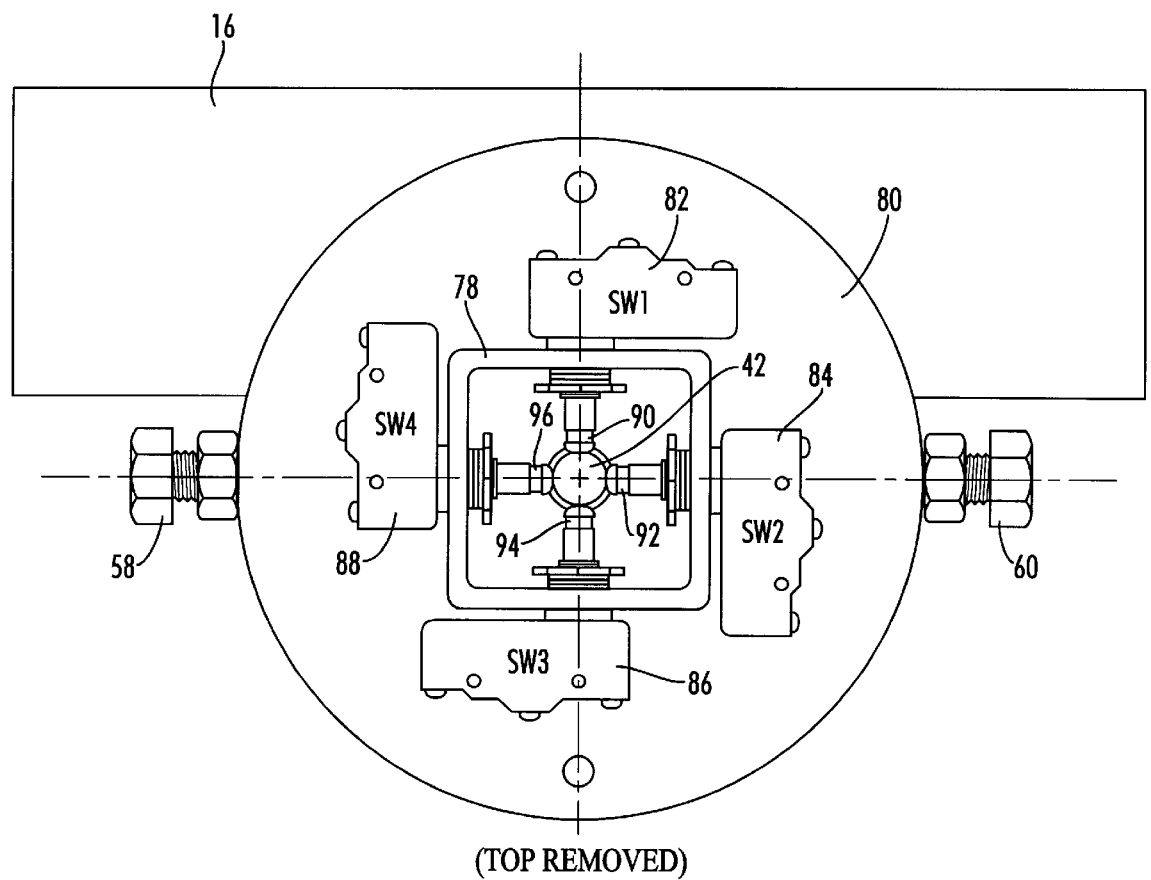
FIG. 6 is a top view of the switch bracket assembly of the present invention.

With reference to FIGS. 2 and 6, the switch bracket assembly comprises a switch bracket 78 supported by a switch bracket base 80. The switch bracket base 80 may be secured to the sensor housing 12 by screws any other suitable means of fastening, such as bolts, pins, tack welds, etc. In the preferred embodiment, four switches 82, 84, 86 and 88 are mounted to the switch bracket assembly. Switch contacts 90, 92, 94 and 96 are positioned proximate pilot shaft 42, which extends through a central bore 98 in the switch bracket base 80. Accordingly, when the pendulum assembly moves in response to a change in orientation of the tilt table 26, the pilot shaft 42 engages at least one of the switch contacts 90, 92, 94 and 96.

With reference to FIGS. 2 and 4, a cover 14 for the housing 12 is provided to protect switches 82, 84, 86 and 88. The cover 14 preferably includes a lip 99 around the periphery which engages the housing 12 in an overlapping relationship when installed thereon. The cover 14 is secured to the housing 12 by screws or any other suitable means of attachment, such as bolts or pins, which will enable removal of the cover 14. The electrical wiring associated with switches 82, 84, 86 and 88 passes through a conduit 100 in the cover 14 to solenoids associated with a hydraulic system (not shown).

Figure 7:
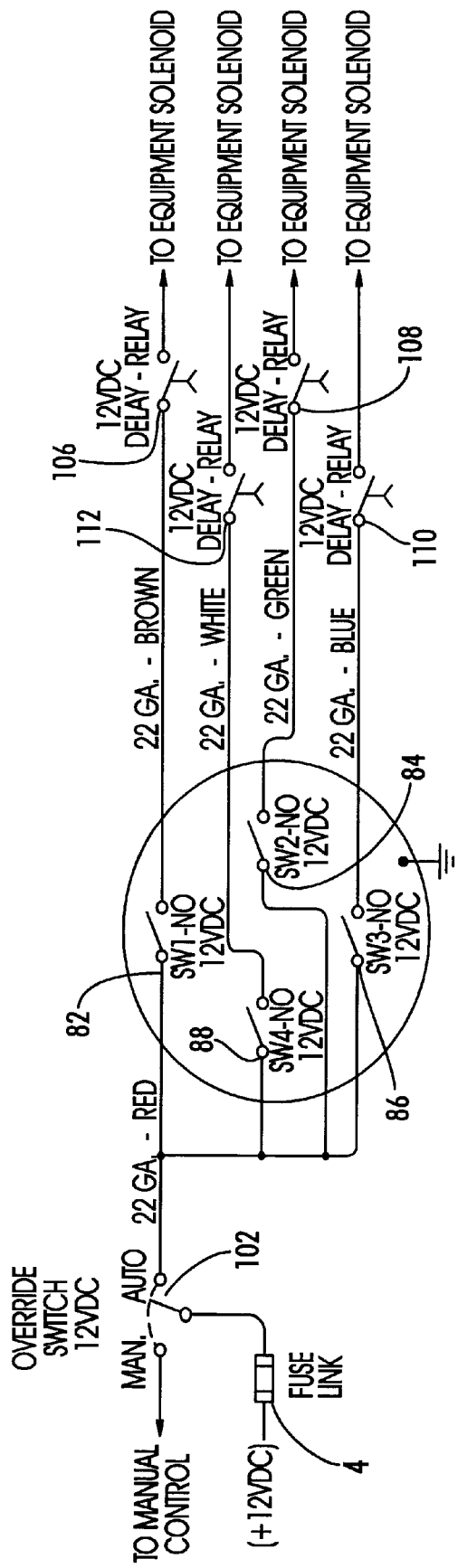
FIG. 7 is a wiring diagram for the control circuit of the leveling device of the present invention.

With reference to FIG. 7, the control circuit for the sensing device 10 includes a manual/automatic control switch 102, a fusible link 104 to a power supply, and switches 82, 84, 86 and 88 for signaling a change in orientation of the tilt table 26. Typically, extension of the boom assembly 22 will result in a temporary change in orientation of the vehicle 18. Accordingly, delay relays 106, 108, 110, and 112 are provided to inhibit re-leveling of the tilt table 26 during extension of the boom assembly 22.

Thus, although there have been described particular embodiments of the present invention of a new and useful automatic leveling system for off-road vehicles, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. An automatic leveling system for off-road equipment having a cab and boom assembly mounted to a carrier base via a tilt table, the system comprising:

a sensing device mounted to the tilt table;

a control circuit for electrically connecting the sensing device to a mechanism capable of adjusting the orientation of the tilt table with respect to the carrier base;

wherein the sensing device further comprises, a housing, a pendulum suspended on a gimbal within the housing, the pendulum having a shaft protruding from an end thereof; and wherein the control circuit includes a plurality of switches positioned proximate the shaft and capable of signaling a change in orientation of the tilt table.

2. The leveling system of claim 1, wherein the control circuit further comprises:

a delay circuit for inhibiting leveling of the tilt table during extension of the boom assembly.

3. The leveling system of claim 1, wherein the gimbal comprises:

a ring pivotally attached to the housing; and a shaft pivotally attached to the ring for supporting the pendulum, wherein the shaft pivots about an axis normal to the axis of rotation of the ring.

4. The leveling system of claim 1, further including:

a bracket attached to the housing for mounting the sensing device to the tilt table.

5. The leveling system of claim 1, further comprising:

a cover configured to cooperatively engage the housing for protecting the switches.

6. An automatic leveling system for a vehicle having a cab and boom assembly mounted to a carrier base via a tilt table, the system comprising:

a pendulum suspended on a gimbal assembly;

a plurality of switches having contacts positioned proximate a shaft protruding from the pendulum;

control circuitry for electrically connecting the switches to a system for adjusting the orientation of the tilt table relative to the carrier base; and wherein the pendulum and the switches are contained within a housing mounted to the tilt table for sensing changes in the orientation of the tilt table.

7. The leveling system of claim 6, wherein the pendulum further has:

a pendulum body; and a pendulum base attached to the pendulum body; and wherein the pendulum base is of a diameter that is greater than a diameter of the pendulum body.

8. The leveling system of claim 6, wherein the plurality of switches are mounted to a switch bracket assembly.

9. The leveling system of claim 6, wherein the switch bracket assembly further comprises:

a switch bracket mounted to a switch bracket base.

10. The leveling system of claim 6, wherein the housing further comprises:

a cover.

* * * * *